United States Patent
Brooks

(10) Patent No.: US 7,231,655 B2
(45) Date of Patent: Jun. 12, 2007

(54) TECHNIQUE FOR REVERSE TRANSPORT OF DATA IN A HYBRID FIBER COAX CABLE SYSTEM

(75) Inventor: Paul D. Brooks, Highlands Ranch, CO (US)

(73) Assignee: Time Warner Cable, Stamford, CT (US)

( * ) Notice: Subject to any disclaimer, the term of this patent is extended or adjusted under 35 U.S.C. 154(b) by 986 days.

(21) Appl. No.: 09/923,038

(22) Filed: Aug. 6, 2001

(65) Prior Publication Data

US 2003/0028897 A1 Feb. 6, 2003

(51) Int. Cl.
- *H04N 7/173* (2006.01)
- *H04N 7/16* (2006.01)
- *H04J 14/00* (2006.01)

(52) U.S. Cl. ............... 725/114; 725/129; 725/144; 398/72

(58) Field of Classification Search .......... 725/144, 725/114, 129, 118; 398/66–70, 72, 74–75, 398/115, 176
See application file for complete search history.

(56) References Cited

U.S. PATENT DOCUMENTS

| | | | | |
|---|---|---|---|---|
| 5,488,413 A | * | 1/1996 | Elder et al. ............... 725/106 |
| 5,517,232 A | * | 5/1996 | Heidemann et al. .......... 725/98 |
| 5,642,153 A | * | 6/1997 | Chaney et al. ............... 725/40 |
| 5,815,295 A | * | 9/1998 | Darcie et al. ............... 398/72 |
| 6,011,921 A | * | 1/2000 | Takahashi et al. ............ 710/48 |
| 6,041,056 A | * | 3/2000 | Bigham et al. ........ 370/395.64 |
| 6,163,537 A | * | 12/2000 | Thacker ....................... 370/352 |
| 6,538,781 B1 | * | 3/2003 | Beierle et al. ................ 398/79 |
| 6,895,043 B1 | * | 5/2005 | Naegeli et al. ............. 375/224 |
| 6,965,616 B1 | * | 11/2005 | Quigley et al. ............. 370/480 |
| 2002/0129379 A1 | * | 9/2002 | Levinson et al. ........... 725/129 |

* cited by examiner

*Primary Examiner*—John Miller
*Assistant Examiner*—Sumaiya A. Chowdhury
(74) *Attorney, Agent, or Firm*—Straub & Pokotylo; Michael P. Straub

(57) ABSTRACT

In a hybrid fiber coax (HFC) cable system, data is communicated upstream from user terminals to a headend of the system to realize various interactive services. The user terminals generate analog modulated signals representing the user data, which populate different channels in a reverse passband of the system. In accordance with the invention, the analog modulated signals are transformed to the corresponding digital baseband signals containing the data. The resulting digital baseband signals are optically transmitted to the headend, thereby efficiently utilizing the limited capacity of the fiber optical portion of the HFC cable system.

20 Claims, 4 Drawing Sheets

260

540

TECHNIQUE FOR REVERSE TRANSPORT OF DATA IN A HYBRID FIBER COAX CABLE SYSTEM

FIELD OF THE INVENTION

The invention relates generally to a communications technique, and more particularly to a technique for upstream communication of data in a hybrid fiber coax cable system.

BACKGROUND OF THE INVENTION

Cable television is typically provided by broadcasting television programming over a community access television (CATV) network including a hybrid fiber coax (HFC) cable system. In the United States, a forward passband, 50 MHz to 550 MHz, is allocated for transmission of CATV signals containing program material from a headend of the HFC cable system to the premises of subscribers or end users. Such transmission of the CATV signals from the headend to the end user premises is said to be in a "forward" or "downstream" direction.

In the "reverse" or "upstream" direction, an end user may use a terminal to transmit data to the headend to realize interactive services such as interactive games, telephone services, home shopping and Internet access. In the United States, the upstream data is transmitted through a reverse passband, 5 MHz to 42 MHz, of the HFC cable system. The terminal used by the end user is connected to, or incorporates, a cable modem for modulating a specified carrier with the data to generate a radio frequency (RF) signal representing the data. The RF signal populates a channel corresponding to the carrier in the reverse passband.

FIG. 1 illustrates a prior art arrangement including an HFC cable system with only those components relevant to upstream data transmission being shown. In FIG. 1, an end user may use terminal 100, e.g., a set top terminal or computer with a cable modem, to transmit data upstream to headend 140. In a well known manner, terminal 100 generates an RF signal representing the data, which populates a channel in the reverse passband. The RF signal from terminal 100 is combined by combiner 110 at a distribution tap with other RF signals, which contain data from other terminals and populate other channels in the reverse passband. The combined analog upstream signal is transported through cable distribution network 115 to distribution node 120. Linear optical transmitter 125 in node 120 receives the combined signal from link 117 extending from network 115. Transmitter 125, incorporating a linear laser, converts the combined signal into an optical signal. The latter traverses optical fiber 130 to headend 140. Linear optical receiver 135 in headend 140 converts the optical signal back to the combined signal. Cable modem termination system (CMTS) 150 processes the combined signal to recover the data from the respective terminals, and reformats the data in proper formats for further transmission to appropriate servers to realize various interactive services.

In the cable industry, the Data-Over-Cable Service Interface Specifications (DOCSIS) are well known, which specify, among others, the data format of the upstream transmission, and the methods of, and equipment used in, the transmission. According to the DOCSIS, each user terminal can be programmed to transmit on a carrier frequency and through the corresponding channel specified by the CMTS. The carrier frequencies are selected to optimize the upstream communication by avoiding different types of noise, power losses or other problems occurring at known frequencies in the reverse passband. As a result, the reverse passband can accommodate up to 7 or 8 DOCSIS compatible channels.

As additional interactive services are being introduced and more and more users are subscribing to the interactive services, it is anticipated that the HFC cable system capacity for upstream communication, which is limited, will soon be overly strained. Accordingly, it is desirable to improve the traditional upstream communication technique to effectively utilize the limited HFC cable system capacity.

SUMMARY OF THE INVENTION

The invention overrcomes the prior art limitations by optically communicating a baseband digital signal representing the user data to the headend of an HFC cable system, thereby improving the capacity of at least the fiber optical portion of the system. In accordance with the invention, at a distribution node the individual RF signals in the aforementioned combined analog upstream signal are selected, and demodulated to form the corresponding digital baseband signals containing the user data. The resulting digital baseband signals are then multiplexed. An optical signal representative of the multiplexed signal is generated, which then traverses an optical fiber extending to the headend.

The optical signal in the headend is converted back to the electrical, multiplexed signal. The latter is demultiplexed, resulting in an output of the digital baseband signals, respectively. In a first illustrative embodiment of the invention, a modulating device, together with a combiner, is used to process the digital baseband signals to re-generate the aforementioned combined analog upstream signal so as to feed the prior art CMTS. In a second illustrative embodiment of the invention, the digital baseband signals are directly fed to a modified CMTS having a digital input interface for receiving the baseband signals.

BRIEF DESCRIPTION OF THE DRAWING

Further objects, features and advantages of the invention will become apparent from the following detailed description taken in conjunction with the accompanying drawing, in which.

Throughout this disclosure, unless otherwise stated, like features, elements, components or sections in the figures are denoted by the same reference numeral.

DETAILED DESCRIPTION

It is well known that in the United States cable television is provided through a forward passband, 50 MHz to 550 MHz, of a hybrid fiber coax (HFC) cable system to the subscriber premises. It is also well known that in the United States certain interactive services such as interactive games, telephone services, home shopping and Internet access are provided using a reverse passband, 5 MHz to 42 MHz, of the HFC cable system. However, as new interactive services are being introduced and more and more users are subscribing to the interactive services, it is anticipated that the capacity of the HFC cable system for the reverse or upstream communication will soon be overly strained. The invention improves the traditional upstream communication technique to efficiently utilize the HFC cable system capacity and, In particular, the capacity of the fiber optical portion of the system.

Figure 1:
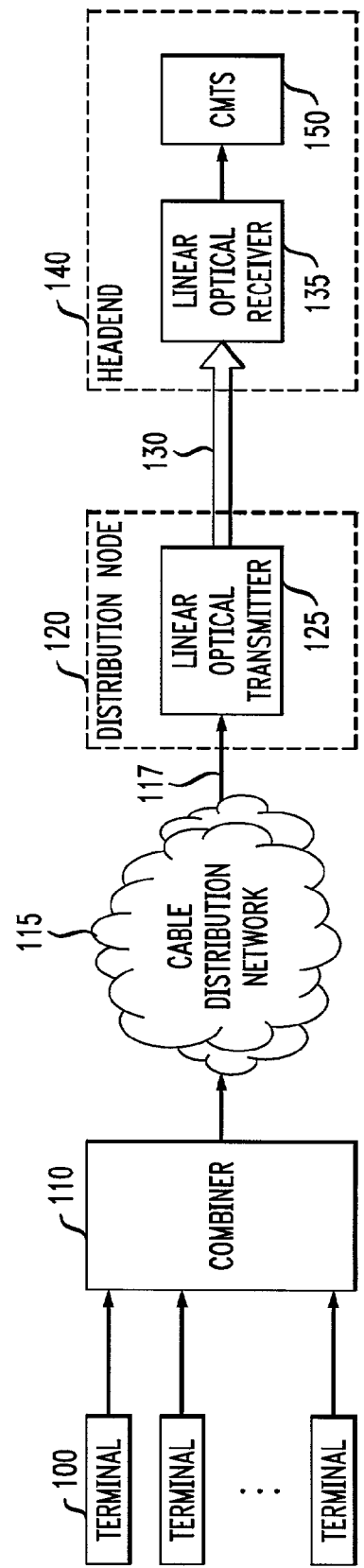
FIG. 1 illustrates a prior art arrangement including a portion of an HFC cable system for upstream communication.
Figure 2:
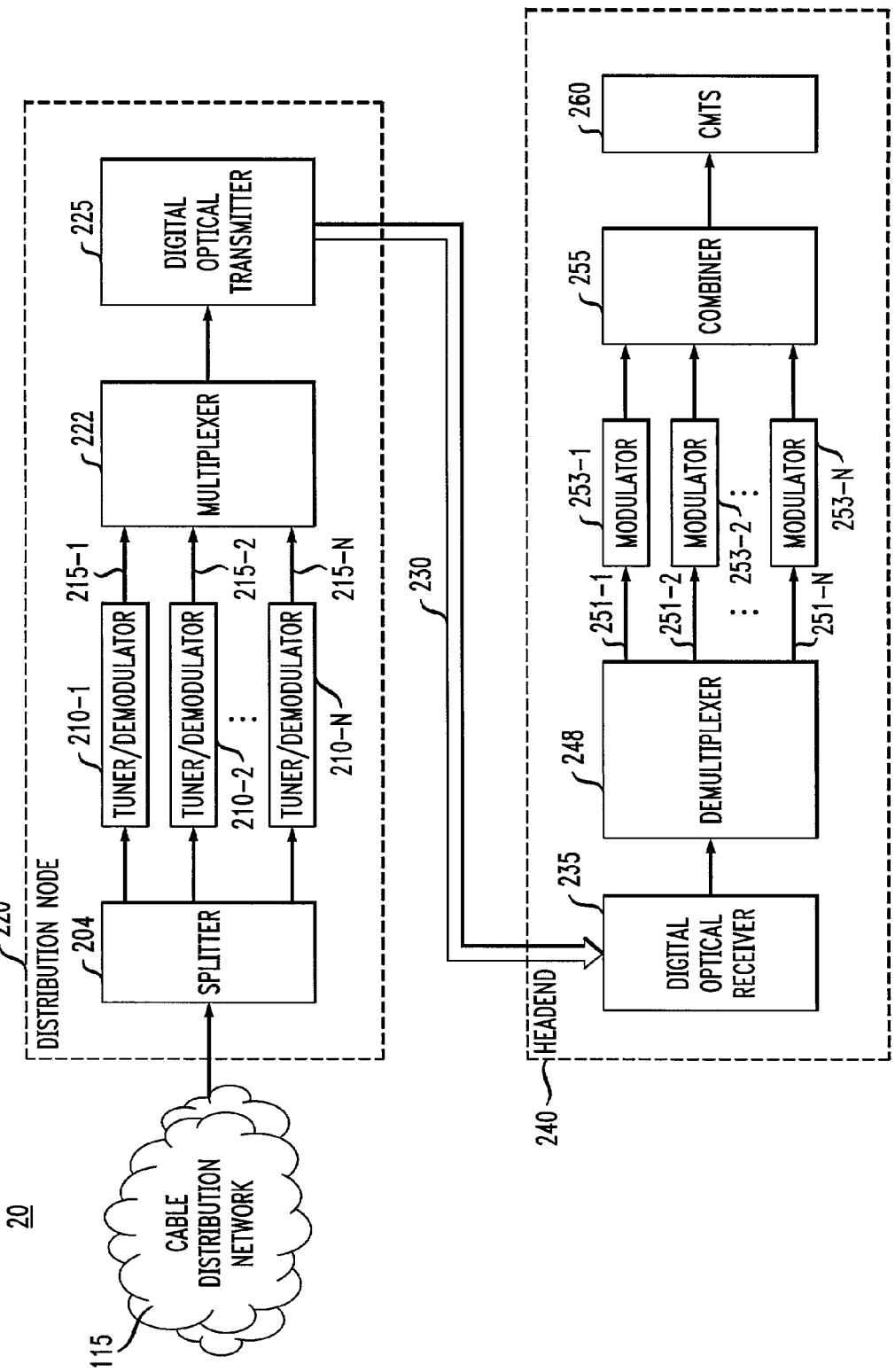
FIG. 2 is a block diagram of an HFC cable system in accordance with the invention relevant to the upstream communication.

FIG. 2 illustrates HFC cable system 20 in accordance with the invention with only components relevant to the upstream communication being shown. As in the prior art arrangement of FIG. 1, cable distribution network 115 transports a combined analog upstream signal, populating a reverse passband (e.g., 5 MHz to 42 MHz), to a distribution node. The combined signal consists of individual RF signals generated by different user terminals, respectively. Each individual RF signal represents data entered by a user on the corresponding terminal to realize an interactive service. Each terminal (e.g., a set top terminal or computer) incorporates, or is connected to, a cable modem for modulating a designated carrier with the user data to generate the corresponding RF signal, which populates a channel associated with the carrier.

Figure 3:
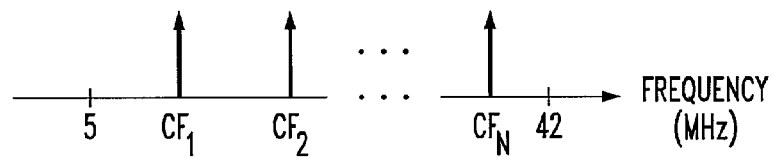
FIG. 3 illustrates selected carriers for the upstream communication in a reverse passband of the system of FIG. 2.

FIG. 3 illustrates N carriers associated with N channels in the reverse passband which are pre-selected for use in this instance, where N is a predetermined number. As shown in FIG. 3, the frequency of a first channel carrier is denoted $CF_1$; the frequency of a second channel carrier is denoted $CF_2$; . . . ; and the frequency of an $N^{th}$ channel carrier is denoted $CF_N$.

In accordance with the invention, to efficiently utilize the capacity of the optical fiber portion of system 20 in FIG. 2, the signals representing the data to be transmitted by optical transmitter 225 are preferably in baseband, i.e., unmodulated digital signals. Thus, before the optical transmission, the combined analog upstream signal from network 115 is selected (e.g., band-passed) at distribution node 220 to obtain the individual RF signals. The latter are then demodulated to obtain the corresponding digital baseband signals representing the data bit streams from the respective user terminals. To that end, the combined analog upstream signal is fed to splitter 204 where duplicates of the combined signal, which may be gain adjusted, are provided to a bank of N tuners/demodulators, denoted 210-1 through 210-N. In response, tuner/demodulator 210-1, which is tuned to the first channel, band-passes the combined signal at $CF_1$ to isolate the RF signal in the first channel, and demodulates the isolated RF signal to form the corresponding digital baseband signal (i.e., a first data bit stream) associated with the first channel on lead 215-1; tuner/demodulator 210-2, which is tuned to the second channel, band-passes the combined signal at $CF_2$ to isolate the RF signal in the second channel, and demodulates the isolated RF signal to form the corresponding digital baseband signal (i.e., a second data bit stream) associated with the second channel on lead 215-2; . . . ; and tuner/demodulator 210-N, which is tuned to the $N^{th}$ channel, band-passes the combined signal at $CF_N$ to isolate the RF signal in the $N^{th}$ channel, and demodulates the isolated RF signal to form the corresponding digital baseband signal (i.e., an $N^{th}$ data bit stream) associated with the $N^{th}$ channel on lead 215-N.

It should be noted that each tuner/demodulator may be realized by installing a tuner separately from the associated demodulator or may be combined. A variety of other types of tuners/demodulators may be realized using one or more digital signal processors (DSPs). A DSP typically comprises a combination of digital logic devices and other components, which may be a state machine or implemented with a dedicated microprocessor or micro-controller running a software program or having functions programmed in firmware. Digital signal processing techniques for tuning to a carrier frequency and demodulating the RF signal thereat are known in the art.

The N individual data bit streams from respective leads 215-1 through 215-N are time-multiplexed in a conventional manner by multiplexer 222 to form a multiplexed data bit stream, which is fed to digital optical transmitter 225. In response, transmitter 225, incorporating a digital laser, generates an optical signal representing the multiplexed data bit stream. The optical signal traverses optical fiber 230, which extends to headend 240.

It should be noted that digital optical transmitter 225 here is less costly than the linear optical transmitter 125 used in the prior art arrangement of FIG. 1. This stems from the fact that the "on" or "off" level of a digital signal here does not need to be achieved by transmitter 225 as precisely as the analog signal level by transmitter 125.

It should also be noted that in an alternative embodiment, to ensure data integrity, an error correction coder is used to encode the multiplexed data bit stream according to a well known error correction coding technique, e.g., the Reed Solomon coding technique, cyclic redundancy check (CRC) binary block coding technique, etc., to afford correction of any errors in the multiplexed data bit stream after its optical transmission.

The aforementioned optical signal is received by digital optical receiver 235 in headend 240. Receiver 235 performs the inverse function to transmitter 225 described above and converts the optical signal back to the corresponding multiplexed data bit stream in electrical form. In the alternative embodiment, an error correction decoder is then used to process the multiplexed data bit stream to correct any errors therein, in accordance with the well known error correction coding technique. In any event, the multiplexed data bit stream is demultiplexed by demultiplexer 248 which performs the inverse function to multiplexer 222 described above. As a result, demultiplexer 248 provides the N individual data bit streams associated with the respective channels on leads 251-1 through 251-N. These leads extend to a bank of modulators 253-1 through 253-N, respectively. This bank of modulators, together with combiner 255, performs the inverse function to the bank of tuners/demodulators 210-1 through 210-N previously described. Specifically, modulator 253-1 is used to modulate a first channel carrier, having a frequency $CF_1$, with a first incoming data bit stream to generate an RF signal in the first channel; modulator 250-1 is used to modulate a second channel carrier, having a frequency $CF_2$, with a second incoming data bit stream to generate an RF signal in the second channel; . . . ; and modulator 250-N is used to modulate an $N^{th}$ channel carrier, having a frequency $CF_N$, with an $N^{th}$ incoming data bit stream to generate an RF signal in the $N^{th}$ channel. Combiner 255 combines the resulting RF signals to form a combined analog signal. The combined analog signal is then fed to CMTS 260, which is identical to prior art CMTS 150 in FIG. 1. Like prior art CMTS 150, CMTS 260 processes the combined analog signal to recover the data from the respective user terminals, and reformats the data in proper formats, e.g., Internet protocol (IP) packets, ATM cells, etc., for further transmission to appropriate servers to realize various interactive services.

Figure 4:
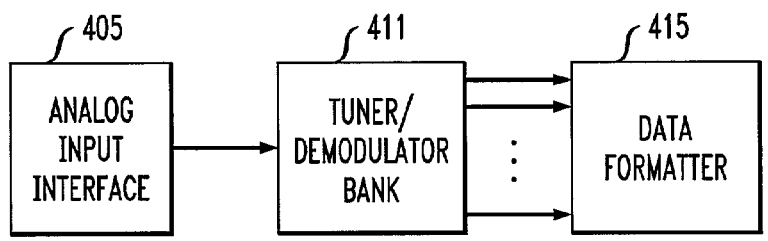
FIG. 4 illustrates a prior art CMTS used in an HFC cable system.

It should be noted that the prior art CMTS has an analog input interface since the input to the CMTS is traditionally a modulated analog signal, e.g., the aforementioned combined analog signal, containing data from the user terminals. I have recognized that the prior art CMTS invariably demodulates the input analog signal to obtain the data in baseband digital form before the data is reformatted (e.g., packetized) for further transmission. FIG. 4 is a block diagram of the prior art CMTS, e.g., CMTS 260, used to illustrate its data formatting function only. As shown in FIG. 4, tuner/demodulator bank 411 receives the combined analog signal through analog input interface 405. Bank 411 performs the function analogous to that of tuners/demodulators 210-1 through 210-N on the received signal to yield the aforementioned N data bit streams. The latter are properly reformatted by data formatter 415 for further transmission.

Figure 5:
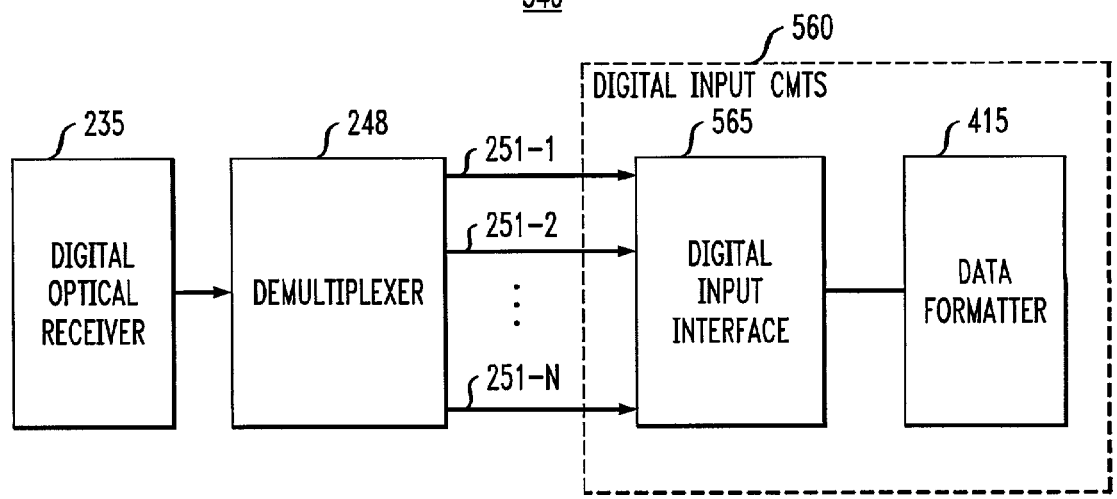
FIG. 5 is a block diagram of a headend which may be used in the HFC cable system in accordance with the invention.

Thus, in a second illustrative embodiment of the invention, headend 240 is replaced by headend 540 in FIG. 5, which includes digital input CMTS 560 modified from the prior art CMTS to receive digital inputs directly from demultiplexer 248. Like headend 240 in the previous embodiment, headend 540 includes digital optical receiver 235 and demultiplexer 248 whose functions are previously described. However, the N data bit streams provided by demultiplexer 248 on leads 251-1 through 251-N in headend 540 are directly fed to digital input CMTS 560, thus eliminating use of modulators 253-1 through 253-N, and combiner 255 as in headend 240. The N data bit streams are received by digital input interface 565 in CMTS 560 where adjustments to the bit streams are made, e.g., adjustments to their digital signal levels, to ensure their proper input to data formatter 415. In addition, signaling standards for modem level control may need to be developed and implemented in the tuners/demodulators in distribution node 220 and CMTS 560. Thus, compared with prior art CMTS 260, CMTS 560 is advantageously simplified in that at least use of tuner/demodulator bank 411 as in CMTS 260 is obviated.

Figure 6:
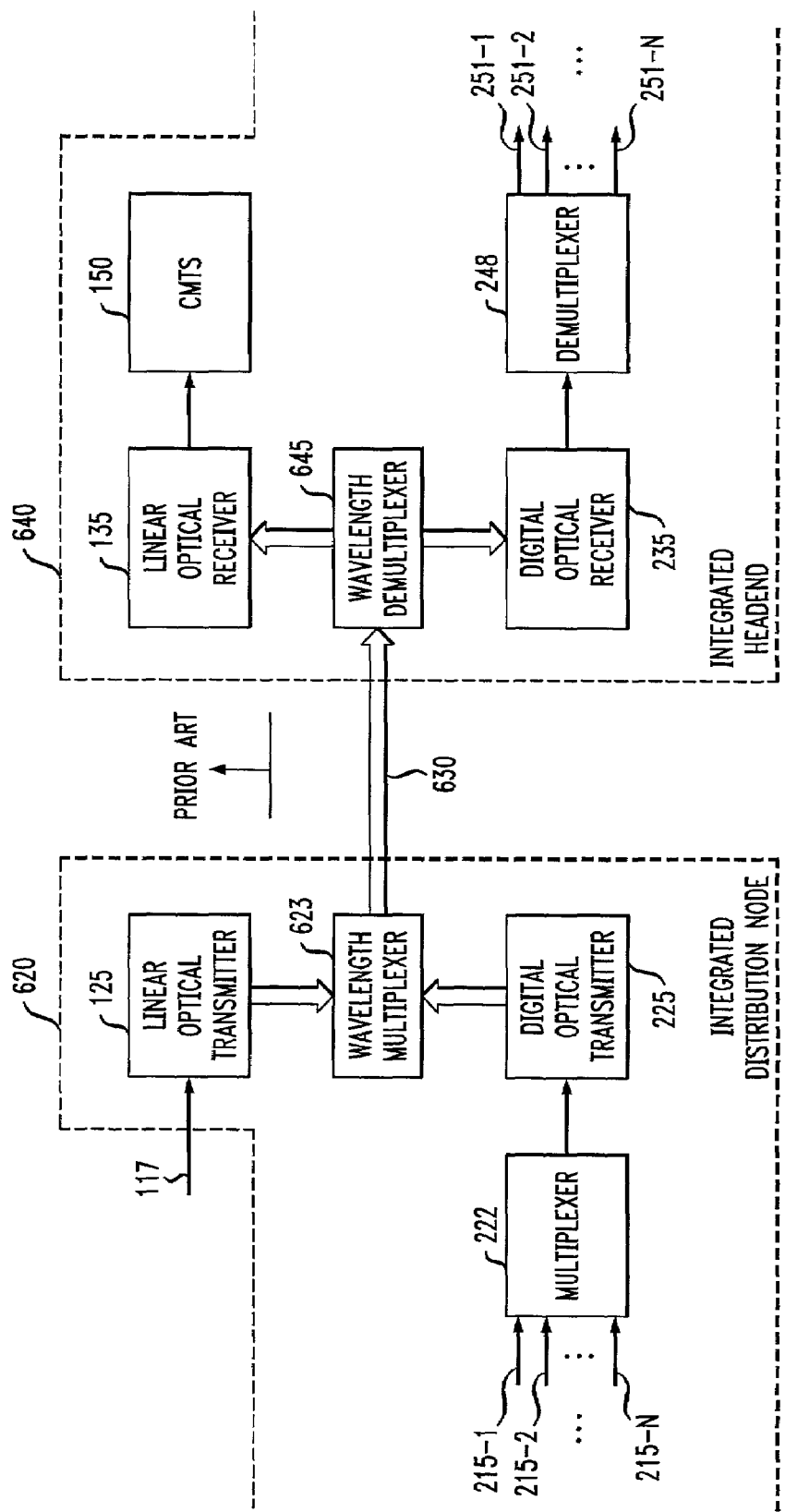
FIG. 6 illustrates an integrated HFC cable system incorporating both the prior art and inventive upstream communication techniques.

FIG. 6 illustrates an HFC cable system incorporating the prior art upstream communication technique, integrated with the inventive upstream communication technique. As shown in FIG. 6, integrated distribution node 620 includes linear optical transmitter 125 which, in a prior art way, generates a first optical signal at a first wavelength representing the aforementioned combined analog upstream signal from link 117, which is modulated. This first optical signal is provided to wavelength multiplexer 623. At the same time, digital optical transmitter 225 generates a second optical signal at a second wavelength representing the multiplexed data bit stream from multiplexer 222, which is unmodulated (i.e., baseband). As described before, the multiplexed data bit stream results from time-multiplexing by multiplexer 222 the aforementioned N data bit streams from leads 215-1 through 215-N, respectively. Wavelength multiplexer 623 in a conventional manner multiplexes the first and second optical signals having different wavelengths, resulting in a composite optical signal. This composite optical signal traverses optical fiber 630 to wavelength demultiplexer 645 in integrated headend 640. Demultiplexer 645 performs an inverse function to wavelength multiplexer 623, and separates from the composite optical signal the individual first and second optical signals. The first optical signal is directed to linear optical receiver 135, where it is converted back to the combined analog upstream signal in electrical form. CMTS 150 then processes the resulting upstream signal in a manner described before.

At the same time, the second optical signal is directed to digital optical receiver 235, where it is converted back to the multiplexed data bit stream in electrical form. The latter is demultplexed by demultiplexer 248 into the aforementioned N data bit streams, which are transported by leads 251-1 through 251-N, respectively, to other headend processors described before.

The foregoing merely illustrates the principles of the invention. It will thus be appreciated that those skilled in the art will be able to devise numerous other arrangements which embody the principles of the invention and are thus within its spirit and scope.

For example, HFC cable system 20 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors. Thus, for example, tuners/demodulators 210-1 through 210-N as well as such ancillary devices as splitter 204 and multiplexer 222 may be realized by one or more DSPs.

What is claimed is:

1. A system in a headend of an HFC cable arrangement, the system comprising:
    an optical receiver for converting an upstream optical signal to a composite baseband signal representing a plurality of information streams;
    a demultiplexing device responsive to the composite baseband signal for generating the plurality of information streams;
    a plurality of modulators, coupled to said demultiplexing device, each of the plurality of modulators corresponding to a different one of the plurality of information streams, each modulator for producing a corresponding modulated analog signal from one of said plurality of information streams;
    a combiner for combining a plurality of modulated analog signals generated by said modulators to produce a combined modulated analog signal; and
    a subsystem for processing the combined modulated analog signal to realize the service.

2. The system of claim 1,
    wherein the upstream optical signal includes data from a plurality of different user terminals; and
    wherein the subsystem for processing recovers data from respective ones of the different user terminals and reformats the recovered data into Internet Protocol (IP) packets as part of an interactive service.

3. The system of claim 1 wherein the at least one information stream includes data bits.

4. The system of claim 1 further comprising an apparatus for providing cable television, which is different from the service.

5. The system of claim 4 wherein a signal representing the cable television travels in a direction different from that of the optical signal in the HFC cable arrangement.

6. The system of claim 1 wherein the subsystem includes a device for modulating a designated carrier with the at least one information stream to form a modulated signal.

7. The system of claim 1 wherein the subsystem includes a cable modem termination system (CMTS).

8. The system of claim 7 wherein the CMTS includes an analog input interface.

9. The system of claim 1 wherein the composite baseband signal is encoded in accordance with an error correction coding technique.

10. The system of claim 1, wherein said subsystem for processing the combined modulated analog signal has an analog input interface for receiving said combined modulated analog signal.

11. The system of claim 1,
wherein said headend is coupled to a distribution node by an optical fiber which supplies said optical receiver with said upstream optical signal and which receives a downstream optical signal from said headend.

12. A method of operating a headend of an HFC cable arrangement, the method comprising:
receiving an upstream optical signal;
converting the received upstream optical signal to a composite baseband signal representing a plurality of information streams;
generating from the composite baseband signal, the plurality of information streams;
modulating at least some of said plurality of information streams to produce modulated analog signals, a separate modulated analog signal being produced from each of said at least some of said plurality of information streams;
combining a plurality of said separate modulated analog signals generated to produce a combined modulated analog signal;
and processing the combined modulated analog signal to realize the service.

13. The method of claim 12,
wherein the upstream optical signal includes data from a plurality of different user terminals; and
wherein processing the combined modulated analog signal to realize the service includes:
recovering data from respective ones of the different user terminals from said combined modulated signal and reformatting at least some of the recovered data into Internet Protocol (IP) packets as part of an interactive service.

14. The method of claim 12 wherein the at least one information stream includes data bits.

15. The method of claim 12 wherein in processing the at least one information stream, a designated carrier is modulated with the at least one information stream to form a modulated signal.

16. The method of claim 12 wherein the composite baseband signal is encoded in accordance with an error correction coding technique.

17. The method of claim 12, wherein
modulating at least some of said plurality of information streams includes modulating each of the at least some of said plurality of information streams using a different carrier frequency corresponding to a separate channel.

18. The method of claim 17, wherein
processing the combined modulated analog signal to realize the service includes:
recovering data from individual user terminals; and
reformatting the data into Internet Protocol packets.

19. The method of claim 17, wherein processing the combined modulated analog signal to realize the service includes:
recovering data from individual user terminals; and
reformatting the data into ATM cells.

20. The method of claim 12,
wherein receiving said upstream optical signal includes receiving said upstream optical signal from a distribution node which is coupled to the headend by an optical fiber, said distribution node being coupled to a plurality of user terminals.

* * * * *